United States Patent [19]

Caspari et al.

[11] 4,278,781

[45] Jul. 14, 1981

[54] CATALYST AND PROCESS FOR THE POLYMERIZATION OF ETHYLENE AND TERMINAL OLEFINS

[75] Inventors: Gunter Caspari, Wheaton; David E. Boone, Chicago, both of Ill.

[73] Assignee: Standard Oil Company (Indiana), Chicago, Ill.

[21] Appl. No.: 31,377

[22] Filed: Apr. 19, 1979

Related U.S. Application Data

[63] Continuation-in-part of Ser. No. 841,575, Oct. 12, 1977, abandoned, which is a continuation of Ser. No. 662,816, Mar. 1, 1976, abandoned, which is a continuation-in-part of Ser. No. 242,235, Apr. 7, 1972, abandoned.

[51] Int. Cl.$^3$ .......................... C08F 4/02; C08F 10/02
[52] U.S. Cl. ................ 526/150; 252/429 C; 252/431 R; 526/166; 526/352
[58] Field of Search .............. 252/429 C, 431 R; 526/121, 124, 150

[56] References Cited

U.S. PATENT DOCUMENTS

| | | | |
|---|---|---|---|
| 2,820,778 | 1/1958 | Spaeniz et al. | 526/165 |
| 2,905,645 | 9/1959 | Anderson et al. | 526/166 |
| 3,058,963 | 10/1962 | Vandenberg | 526/153 |
| 3,642,760 | 2/1972 | Baekelmans et al. | 526/121 |
| 3,883,492 | 5/1975 | Selborville et al. | 526/121 |
| 3,984,389 | 10/1976 | Selborville et al. | 526/121 |
| 3,989,879 | 11/1976 | Bergen et al. | 526/124 |
| 3,989,880 | 11/1976 | Bergen et al. | 526/124 |
| 4,056,668 | 11/1977 | Bergen et al. | 526/124 |

FOREIGN PATENT DOCUMENTS

| | | | |
|---|---|---|---|
| 4633569 | 10/1971 | Japan | 526/121 |
| 818033 | 8/1959 | United Kingdom | 526/159 |
| 824195 | 11/1959 | United Kingdom | 526/159 |
| 845878 | 8/1960 | United Kingdom | 526/166 |
| 887544 | 1/1962 | United Kingdom | 526/150 |
| 1122157 | 7/1968 | United Kingdom | 526/126 |
| 1212320 | 11/1970 | United Kingdom | 526/97 |
| 1434264 | 5/1976 | United Kingdom | 526/124 |

*Primary Examiner*—Edward J. Smith
*Attorney, Agent, or Firm*—Stephen L. Hensley; William T. McClain; William H. Magidson

[57] ABSTRACT

A novel catalyst component and process for polymerization of ethylene or an ethylene containing mixture with a terminal olefin which consists essentially of contacting under polymerizing conditions said ethylene or mixture with (a) the reaction product of a Group IVB, Group VB or Group VIB transition metal compound and an organotin compound containing at least one reactive OH group and, (b) an organometallic compound.

18 Claims, No Drawings

CATALYST AND PROCESS FOR THE POLYMERIZATION OF ETHYLENE AND TERMINAL OLEFINS

RELATED APPLICATIONS

This is a continuation-in-part of application Ser. No. 841,575, filed Oct. 12, 1977, now abandoned, which in turn is a continuation of application Ser. No. 662,816, filed Mar. 1, 1976, now abandoned, which in turn is a continuation-in-part of application Ser. No. 242,235, filed Apr. 7, 1972, now abandoned.

SUMMARY OF THE INVENTION

This invention relates to a novel catalyst component and a process for the use thereof for the polymerization of ethylene or an ethylene containing mixture with a terminal olefin. More specifically, the invention relates to a novel catalyst component and a process for the use thereof for the polymerization of ethylene or a mixture of ethylene with an alpha-olefin wherein substantial yields of polymer having a very low melt index are obtained and wherein heat and corrosion stability in the polymeric product is improved due to the presence of occluded organotin compounds.

In accordance with the instant invention, ethylene or an ethylene containing mixture with an alpha-olefin is polymerized to a normally solid polymer at medium pressures and moderate temperatures by contacting said ethylene or mixture with a catalyst system consisting essentially of (a) the reaction product of a Group IVB, Group VB or Group VIB transition metal halide, oxyhalide, ester or haloester and an organotin compound containing at least one reactive OH group and (b) a compound selected from the group consisting of organometallic compounds of Group IA, Group IIA and Group IIIA. Polyethylene produced using the instant catalyst system can be formed in substantial yields and the polymeric product produced has molecular weight distribution which is relatively unaffected by the presence of hydrogen used as a chain terminating agent. Thus, this novel catalyst can be used in conjunction with another catalyst which is more sensitive to hydrogen used as a chain terminating agent in order to vary the molecular weight distribution of the final polymeric product over a substantial range. This molecular weight control allows polymers to be produced which are tailored to specific uses such as, blow molding, plastic pipe, etc.

BACKGROUND OF THE INVENTION

U.S. Pat. No. 2,820,778 describes a catalyst wherein an alkyl or cycloalkyl distannoxane combined with a Group IVB, Group VB or Group VIB transition metal halide is used to polymerize olefins. However, these combinations produce polymeric products in relatively low yield and hence are of limited value.

British Pat. No. 887,544 entitled Process for Polymerizing Propylene teaches use of a hydrocarbon insoluble, brown precipitate formed from, e.g., a tetraalkyltin, titanium tetrachloride and aluminum chloride in conjunction with an organometallic activator, e.g., a trialkylaluminum, for polymerization of propylene. The presence of aluminum chloride reactant is required to get the brown hydrocarbon insoluble component of the British patent.

Now it has been found that by combining certain Group IVB, Group VB or Group VIB transition metal compounds with an organotin compound by reaction of the former with an OH group of the latter, highly active catalyst systems which are relatively insensitive to chain terminating agents such as hydrogen are formed.

STATEMENT OF THE INVENTION

The novel catalyst component of the instant invention is made by the reaction of two materials. The first material is preferably an organotin compound containing at least one reactive OH group, e.g., an alkyl, alkaryl or aryl tin hydroxide or stannonic acid, or an organotin substituted alcohol or carboxylic acid, such as $R_3Sn(CH_2)_xOH$, $R_3Sn(CH_2)_xCO_2H$, $R_2Sn[(CH_2)_xOH]_2$ or $R_2Sn[(CH_2)_xCO_2H]_2$ wherein x runs between 1 and about 20 and R is an alkyl, aryl or alkaryl group. More preferably, the first material is an alkyl, aryl or alkaryl tin hydroxide or stannonic acid. Most preferably, the first material is an alkyl, aryl or alkaryl tin hydroxide. By alkyl is meant here a hydrocarbon radical of one to about six carbon atoms. By aryl and alkaryl is meant hydrocarbon radicals of from six to about twelve carbon atoms.

The second material is usefully any higher valent Group IVB, Group VB or Group VIB halide, oxyhalide, ester or haloester. More preferably, the second material is a higher-valent titanium, vanadium or chromium chloride, bromide, oxychloride, oxybromide, alkoxide, alkoxychloride or alkoxybromide. By alkoxide or alkoxy here is meant an organic radical containing oxygen and one to about six carbon atoms. More preferably, the second material is titanium tetrachloride.

The first and second materials are reacted in amounts and under conditions such that the valence state of the Group IVB, VB, or VIB metal contained in the reaction product is essentially unchanged from that of the Group IVB, VB, or VIB metal contained in the second material. Accordingly, the reaction product of such first and second materials is essentially free of lower valent Group IVB, VB, or VIB metal. For purposes hereof, lower valent Group IVB, VB, or VIB metal is defined as Group IVB, VB, or VIB metal having a valence lower than that of the metal contained in the Group IVB, VB, or VIB metal compound used as the second material.

The relative amounts of the first and second materials which are reacted together depend upon the number of OH groups present per molecule of the first material. The ratio of mols of second material used per mol of OH groups present in the amount of first material reacted preferably ranges from about 0.1:1 to about 30:1. More preferably, the ratio may vary from about 0.2:1 to about 15:1, and, most preferably, this ratio may vary from about 0.5:1 to about 10:1.

Preferably, the first and second materials above are reacted in the appropriate mol ratio at a temperature between about 25° C. and about 125° C. More preferably, the reaction temperature is chosen between about 30° C. and about 120° C. as these temperatures ensure reasonable reaction rates without substantial reduction of the Group IVB, VB, or VIB metal contained in the second material. Most preferably, a reaction temperature between about 50° C. and about 90° C. is used.

Normally, reaction between the first and second materials is carried out under an inert atmosphere by heating them together in the presence of a solvent which dissolves at least partially the Group IVB, Group VB or Group VIB compound. But any substantially inert solvent may be used which dissolves at least in part one of the reactants. By substantially inert is meant here a solvent which does not react appreciably with either material or the product at the reaction temperature. However, reaction between the first and second materials can be accomplished for most reactants in the substantial absence of solvent.

For best results, the catalyst component after reaction is washed with solvent at room or elevated temperatures. Generally, a hydrocarbon or halogenated derivative thereof is chosen as a wash solvent. If washing is employed, usefully, a temperature of about 25° C. to about 125° C. is used depending upon the solubility of the reactants and the product catalyst.

The reaction to form the catalyst component is usefully carried out from about thirty minutes to about forty-eight hours, more preferably, about one hour to about thirty-six hours, and most preferably, about three hours to about twenty-four hours, and produces the reaction product in a finely divided powder form which can be used directly to form the catalyst system which combines the catalyst component with the organometallic compound promoter.

Use of the above catalyst component for the polymerization of ethylene and its mixtures is accompanied, for best results, by the use of a promoter which is a compound selected from the group consisting of organometallic compounds of Groups IA, IIA, and IIIA. More preferably, a lower alkyl trialkylaluminum, alkylaluminum chloride, or dialkylaluminum hydride is used. By lower alkyl here is meant a group containing one to about six carbon atoms. Most preferably, triethylaluminum is the promoter which is used. For best results in liquid phase polymerization (i.e. solution or particle form polymerization processes) using average grade solvents or diluents, part of the total promoter added is used to pretreat the solvent. The remaining promoter is then either admixed with the catalyst and allowed to enter the reactor or added separately to the reactor.

For useful results, the ratio of total millimols of promoter used per gram of catalyst component should be at least about 2:1. More preferably, it is at least about 10:1 and, most preferably, it is at least about 15:1.

The promoted catalyst component described above can be used for polymerizations using a liquid medium in either the particle form variation or the solution form variation in the temperature range from about 0° C. to about 270° C. These promoted catalyst components can be used also in the absence of a liquid medium wherein the olefin is polymerized directly from the vapor phase. The temperature of the polymerization in the absence of a liquid medium should be large enough to give an adequate polymerization rate but not too large to raise the pressure above that which is normally used in this type of process, i.e., about several hundred p.s.i.g.

The temperature of polymerization using a liquid medium depends upon the particular process which is used. In the particle form or slurry process, the polymerization is carried out at a temperature such that the polymer as formed is a solid in the polymerization reactor. The preferred polymerization temperature is about 40° C. to about 108° C. In the solution form the temperature of polymerization preferably varies from about 120° C. to about 270° C. In the vapor (gas) state process the useful temperature range is from about 0° C. to about 130° C., preferably, about 20° C. to about 120° C.

Usefully, the pressure range for the polymerization process is about atmospheric to over 1000 p.s.i.g. More preferably, the polymerization pressure varies upwards from about 100 p.s.i.g. and, most preferably, the polymerization range as applied here is about 300 p.s.i.g. or higher.

Whereas the preferred olefin to be polymerized is ethylene, it is found that the novel catalyst when used with a promoter is useful for the polymerization of ethylene with a second olefin, e.g., ethylene and 1-butene and ethylene and propylene.

It is of importance, for best results, that the olefin to be polymerized, for example ethylene, be substantially free of catalyst poisons. Thus, it is preferred to use polymerization grade ethylene and to pass it through a molecular sieve prior to use to remove to a substantial degree traces of moisture, oxygen, carbon dioxide, polar organic compounds and the like.

The organic liquid employed as the polymerization medium in the solution process or particle form process can be an aliphatic alkane or cycloalkane such as pentane, hexane, heptane, or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene or xylene or a halogenated aromatic compound such as chlorobenzene, chloronaphthalene or orthodichlorobenzene. The nature of the medium is subject to considerable variation, although the medium employed should be liquid under the conditions of reaction and relatively inert. Hydrocarbon liquids, preferably hexane or a butane are desirably employed. Other solvents which can be used include ethylbenzene, isopropylbenzene, ethyltoluene, n-propylbenzene, diethylbenzenes, mono- and dialkylnaphthalenes, n-pentane, n-octane, isooctane, and methylcyclohexane.

The solvents and polymerization media employed in practicing this invention should be purified, for best results, from traces of moisture, oxygen, carbon dioxide, polar organic compounds and the like prior to use in the polymerization reaction by contacting the solvent or media, for example, in a distillation procedure or otherwise, with an organoaluminum compound, for example triethylaluminum, prior to or after percolating the solvent or media through silica gel or molecular sieves.

The polymerization time is not critical and will usually be of the order of thirty minutes to several hours in batch processes. Contact times of from one to four hours are commonly employed in autoclave-type reactions. When a continuous process is employed, the contact time in the polymerization zone can also be regulated as desired, and in some cases it is not necessary to employ reaction or contact times much beyond one-half to several hours since a cyclic system can be employed by removal of the polyethylene and return of the polymerization media, if used, and excess monomer to the charging zone wherein the catalyst can be replenished and additional monomer introduced.

The novel catalyst component of this invention is used normally with an additive to influence molecular weight such as hydrogen. However, the polyethylene produced using the instant catalyst component is relatively insensitive to the chain terminating effect of hydrogen and solid polyethylenes having very low melt indices and high intrinsic viscosities reflective of a product having a high molecular weight are commonly formed by the instant catalyst component.

The polyethylenes prepared in accordance with this invention can be extruded, mechanically melted, cast or molded as desired. They can be used to form plates, sheets, films or a variety of molded objects.

While the invention is described in connection with the specific examples below, it is to be understood that these are for illustrative purposes only. Many alternatives, modifications and variations will be apparent to those skilled in the art in the light of the below Examples and such alternatives, modifications and variations fall within the scope and spirit of the appended claims.

EXAMPLE I

A five gram portion of solid triphenyltin hydroxide, $(C_6H_5)_3SnOH$, was suspended in a solution of fifteen millimeters of $TiCl_4$ and one hundred milliliters of hexane. The mixture was refluxed for three hours while stirring under a nitrogen atmosphere. A light yellow product was formed which was separated from the reaction mixture and freed from adhering $TiCl_4$ by decanting and washing six times with hexane.

EXAMPLE II

A 0.17 gram portion of the catalyst prepared according to Example I and a 0.75 gram portion of triethylaluminum were added to ninety milliliters of hexane. The polymerization was carried out in a pressure bottle of 225 milliliters capacity at 50° C. and an ethylene pressure of 40 p.s.i.g. The yield was 20.4 grams after a sixty-five minute reaction time which corresponds to a yield of 110 grams of polymer per hour per gram of solid catalyst.

EXAMPLE III

A one liter, stirred, stainless steel reactor was dried at 330° F. under vacuum. The vacuum was broken by pressuring 670 milliliters of dried hexane containing 0.19 millimols of triethylaluminum into the reactor with 150 p.s.i.g. of ethylene gas. When the temperature of the hexane-ethylene mixture had stabilized at 180° F., 50 p.s.i.g. of hydrogen was introduced. The system was then pressurized to 600 p.s.i.g. with ethylene.

A nine milligram portion of the catalyst of Example I slurried in seven milliliters of hexane was combined with four milliliters of hexane containing 0.76 millimols of triethylaluminum. The combination was placed in a catalyst addition assembly and washed into the reactor with seventeen milliliters of hexane pressured with 700 p.s.i.g. of ethylene. The reactor pressure was maintained at 700 p.s.i.g. with ethylene fed on demand. The polymerization temperature was kept at 180° F. during the one hour run. A 51.0 gram yield of polymer was recovered for a rate of 5700 grams of polymer per gram of solid catalyst per hour. The polymer had no measurable melt index as determined by ASTM D 1238.

EXAMPLE IV

The same equipment, procedures, and reagents were used as in Example III except that:
1. A hydrogen pressure of 150 p.s.i.g. was used.
2. A 0.38 millimol portion of triethylaluminum (in two milliliters of hexane) was mixed with approximately 9 milligrams of the catalyst of Example I slurried in two milliliters of hexane.

A 43.4 gram yield of polymer was recovered for a rate of 4800 grams of polymer per gram of solid catalyst per hour. The polymer had no measurable melt index as determined by ASTM D 1238.

EXAMPLE V

Additional polymerization runs were carried out using the procedure of Example II except for the nature and weight of catalyst employed and the duration of the run. All solid catalysts used in this Example were off-white to yellow in color. The polymerization results are shown in the table below.

TABLE
ETHYLENE POLYMERIZATION RUNS USING ORGANOTIN CATALYSTS

| First Component | Second Component | Total Solid Catalyst used (grams) | Polymerization Rate (grams of polymer per gram of solid catalyst per hour) |
|---|---|---|---|
| trimethyltin hydroxide | $TiCl_4$ | 0.2 | 77 |
| n-butyl-stannonic acid | $TiCl_4$ | 0.2 | 41.5 |
| COMPARATIVE RUN | | | |
| di-n-butyl-tin maleate* | $TiCl_4$ | 0.2 | 26.5 |

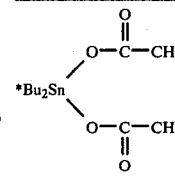

*$Bu_2Sn \begin{smallmatrix} O-C-CH \\ \parallel \\ O \end{smallmatrix} \begin{smallmatrix} \\ O-C-CH \\ \parallel \\ O \end{smallmatrix}$

COMPARATIVE EXAMPLE VI

A solid catalyst component was prepared according to Example I of British Pat. No. 887,544. Polymerization of ethylene was carried out in a 1 liter stirred autoclave using 9.5 milligrams of the component with 80 millimols of $Et_3Al$ under the following conditions: 150 p.s.i.g. hydrogen with a total pressure of 700 p.s.i.g., 180° F. one hour, 250 milliliters hexane. A 5.5 grams quantity of polyethylene was isolated for a rate of 580 grams PE/gram solid catalyst/hour. Melt index was too low to measure. A second polymerization using 50 p.s.i.g. of hydrogen and a total pressure of 700 p.s.i.g. with the other polymerization conditions the same yielded 7.2 grams of polymer for a rate of 758 grams PE/gram solid catalyst/hour. Melt index was 0.1. Both melt indices were determined by ASTM D 1238.

COMPARATIVE EXAMPLE VII

A solid catalyst component was prepared according to Example II of British Pat. No. 887,544. Polymerization of ethylene was carried out in a 1 liter stirred autoclave using 5.0 milligrams of the component with 80 millimols (4 milliliters) of $Et_3Al$ under the same two sets of conditions as set out in Example VI. Melt index was too low to measure. A 38.7 gram quantity of polyethylene (7,740 grams PE/gram solid catalyst/hour and a 40.8 gram quantity of polyethylene (8,160 grams PE/gram solid catalyst/hour) were isolated respectively. Melt index was 0.1. Both melt indices were determined using ASTM D 1238.

COMPARATIVE EXAMPLE VIII

A 5.67 gram quantity of tetrabutyltin was mixed with 2.60 grams of titanium tetrachloride in 50 milliliters of hexane under the catalyst preparation conditions of Example I of British Pat. No. 887,544. After 16 hours stirring at 20° C., no precipitate had formed. Thereafter, 1 gram of AlCl$_3$ was added and in 30 minutes a voluminous, brown precipitate formed.

A second reaction mixture of the above composition was made up under the catalyst preparation conditions of Example II of British Pat. No. 887,544. After 8 hours stirring at 60° C., no precipitate had formed. Thereafter, 1 gram of AlCl$_3$ was added and in 30 minutes a voluminous, brown precipitate formed.

EXAMPLE IX

To study the effects of varying conditions on the valence state of the Group IVB, VB, or VIB metal contained in the invented catalyst components, a series of components (A-F) were prepared from titanium tetrachloride and triphenyltin hydroxide (Ph$_3$SnOH) according to the general procedure of Example I except that reactant ratios and reaction temperatures were varied. Polymerization was conducted in a stirred, 500 ml. reactor using 60 mg. catalyst component (calculated on the basis of Ph$_3$SnOH), 160 mg. triethylaluminum, and 250 ml. hexane. Hydrogen pressure was as specified in the following table and sufficient ethylene was charged at the start and throughout the run to maintain a total pressure of 600 psi. Polymerization temperature was 180° F. Reactant ratios, reaction temperatures, reaction product color, and polymerization results are reported in the following table.

TABLE

| Catalyst Component | Mol Ratio (TiCl$_4$/Ph$_3$SnOH) | Temperature (°C.) | Color | H$_2$ (psig) | Activity* | MI** |
|---|---|---|---|---|---|---|
| A | 0.5:1 | 69 | White | 150 | 35 | 0 |
| B | 0.5:1 | 126 | Light Brown | 70 | 35 | 0 |
| C | 0.5:1 | 151 | Dark Brown | 70 | 52 | 0 |
|   |       |     |            | 150 | 33 | 0 |
| D | 10:1 | 69 | Off-White | 150 | 270 | 0 |
| E | 10:1 | 126 | Light Brown | 70 | 370 | 0 |
| F | 10:1 | 151 | Very Dark Brown | 70 | 440 | 0 |

*g. polyethylene per g. catalyst component per hour (g. catalyst component calculated on the basis of Ph$_3$SnOH).
**MI represents melt index (dg./min.) determined according to ASTM D 1238.

The color of the reaction product serves as an indication of the valence state of the titanium contained in the product, lighter colors being indicative of tetravalent titanium and darker colors being indicative of lower valent titanium. As can be seen from the table, variations in the molar ratio of TiCl$_4$ to Ph$_3$SnOH did not substantially affect reaction product color. Variations in reaction temperature had a greater effect on color. Thus, the white to light brown color of the catalyst components prepared at 69° and 126° C. (components A, B, D, and E) is indicative of a substantial absence of lower valent titanium while the dark brown color of C and F is indicative of greater amounts of lower valent titanium.

We claim:

1. A catalyst component for polymerizing ethylene, a mixture of ethylene and propylene or a mixture of ethylene and butene-1 which consists essentially of the reaction product of a first material which is an organotin compound selected from the group consisting of triphenyltin hydroxide, trimethyltin hydroxide and n-butyl stannonic acid and a second material which is a higher-valent Group IVB, Group VB, or Group VIB transition metal halide, oxyhalide, ester or haloester, said first and second materials being reacted in amounts and under conditions such that the valence state of the Group IVB, Group VB, or Group VIB metal contained in said reaction product is essentially unchanged from that of the Group IVB, VB, or VIB metal contained in said second material.

2. The catalyst component of claim 1 wherein the molar ratio of second material to OH groups in the first material ranges from about 0.1:1 to about 30:1 and the reaction temperature ranges from about 25° to about 125° C.

3. The catalyst component of claim 2 wherein said second material is titanium tetrachloride.

4. The catalyst component of claim 3 wherein said first material is triphenyltin hydroxide.

5. The catalyst component of claim 3 wherein said first material is trimethyltin hydroxide.

6. The catalyst component of claim 3 wherein said first material is n-butyl stannonic acid.

7. A process for the polymerization of ethylene or a mixture of ethylene and propylene or a mixture of ethylene and butene-1 which consists essentially of contacting under polymerizing conditions said ethylene or said mixture with (a) the reaction product of a first material which is an organotin compound selected from the group consisting of triphenyltin hydroxide, trimethyltin hydroxide and n-butyl stannonic acid, and a second material which is a higher valent Group IVB, Group VB, or Group VIB transition metal halide, oxyhalide, ester, or haloester, said first and second materials being reacted in amounts and under conditions such that the valence state of the Group IVB, Group VB, or VIB metal contained in said reaction product is essentially unchanged from that of the Group IVB, Group VB, or Group VIB metal contained in said second material; and (b) an organometallic compound which is a trialkylaluminum, an alkylaluminum chloride, or a dialkylaluminum hydride.

8. The process of claim 7 wherein the molar ratio of second material in (a) to OH groups in the first material in (a) ranges from about 0.1:1 to about 30:1 and the reaction temperature in (a) ranges from about 25° to about 125° C.

9. The process of claim 8 wherein said second material in (a) is titanium tetrachloride.

10. The process of claim 9 wherein said first material in (a) is triphenyltin hydroxide.

11. The process of claim 9 wherein said first material in (a) is trimethyltin hydroxide.

12. The process of claim 9 wherein said first material in (a) is n-butyl stannonic acid.

13. The process of claim 7 wherein said organometallic compound (b) is triethylaluminum.

14. The process of claim 8 wherein said organometallic compound (b) is triethylaluminum.

15. The process of claim 7 wherein ethylene is polymerized.

16. The process of claim 8 wherein ethylene is polymerized.

17. The process of claim 13 wherein ethylene is polymerized.

18. The process of claim 14 wherein ethylene is polymerized.

* * * * *

UNITED STATES PATENT OFFICE
CERTIFICATE OF CORRECTION

Patent No. 4,278,781    Dated July 14, 1981

Inventor(s) GUNTER CASPARI AND DAVID E. BOONE

It is certified that error appears in the above-identified patent and that said Letters Patent are hereby corrected as shown below:

IN THE PATENT:

Cover sheet under "References Cited"

"Spaeniz et al" should be --Spaenig et al.--

"Selborville et al." should be --Delbouille et al.--

"Selborville et al." should be --Delbouille et al.--

"Bergen et al." should be --Berger et al.--

"Bergen et al." should be --Berger et al.--

"Bergen et al." should be --Berger et al.--

Signed and Sealed this

Twentieth Day of April 1982

[SEAL]

Attest:

Attesting Officer

GERALD J. MOSSINGHOFF

Commissioner of Patents and Trademarks